Aug. 12, 1941.　　　　M. LEUPOLD　　　　2,252,013
PEDAL CONTROL AND SPACER FOR POWER AND BRAKE SYSTEMS OR THE LIKE
Filed Sept. 28, 1939　　　2 Sheets-Sheet 1
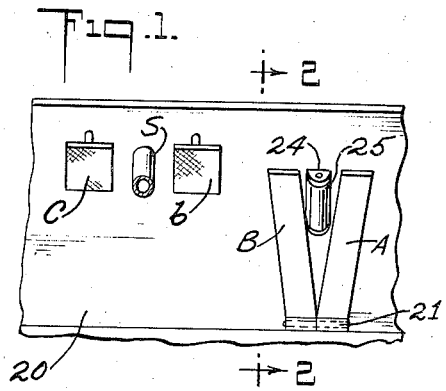
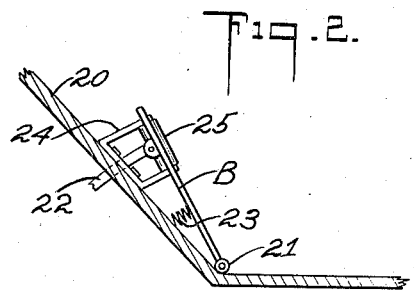
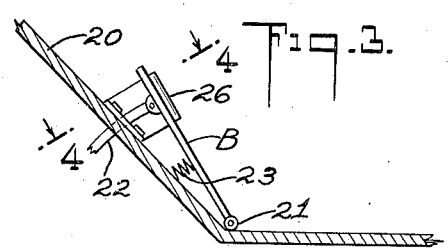
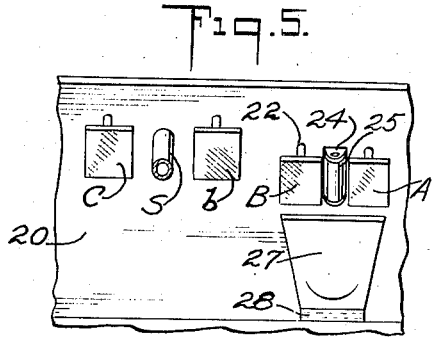
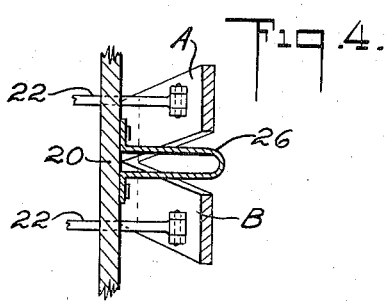
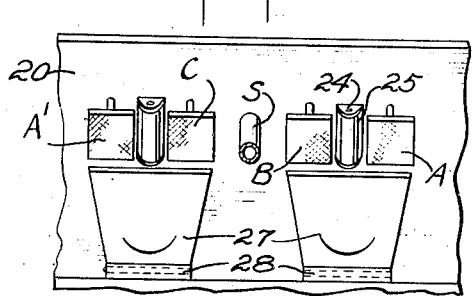
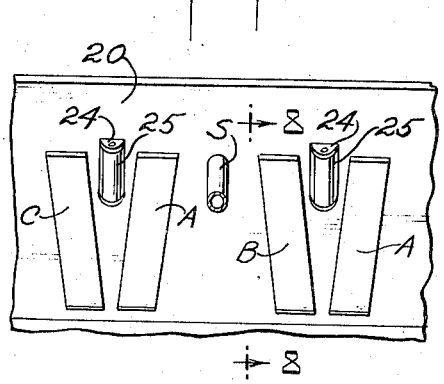
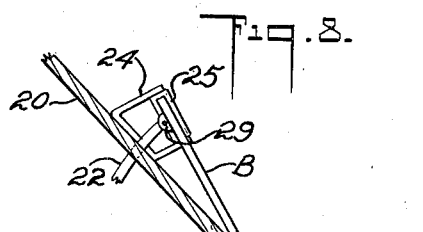
INVENTOR
Mathias Leupold
BY
S. Bernard Jahm
ATTORNEY

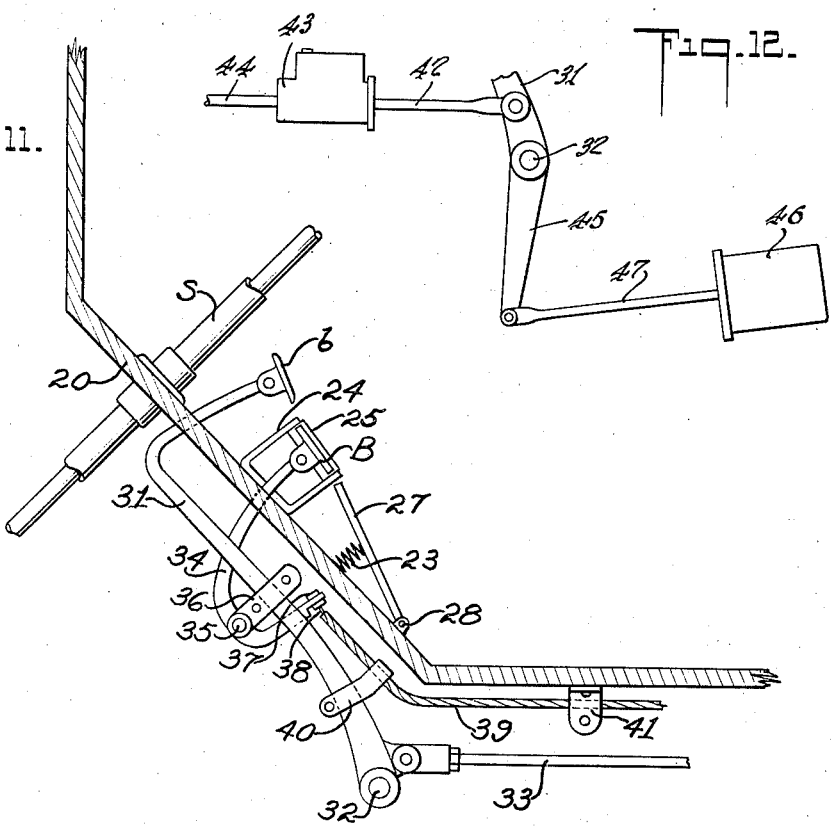

Patented Aug. 12, 1941

2,252,013

UNITED STATES PATENT OFFICE 2,252,013

PEDAL CONTROL AND SPACER FOR POWER AND BRAKE SYSTEMS OR THE LIKE

Mathias Leupold, Jamaica, N. Y.

Application September 28, 1939, Serial No. 296,894

10 Claims. (Cl. 74—512)

This invention relates to pedal controls for power and brake systems or the like and to novel spacer elements between the pedals which make for greater safety and greater speed of operation.

An object of this invention is to provide a pedal control system in which all pedals are placed on a single level so that the foot can slide from one pedal to the other with a minimum time interval, thus providing greater speed of operation than heretofore.

Another object of this invention is to provide novel spacer elements which are separate and distinct from the pedals and which are placed between adjacent pedals thereby eliminating the possibility that two adjacent pedals can be operated simultaneously. This provides for greater safety in operation.

A further object of this invention is to provide novel foot supports whereby the whole foot is adequately supported and easily shifted from pedal to pedal and therefore less fatiguing to the operator.

Another object of this invention is to provide a novel brake linkage and pedal control for operation of a power operated and manually operated brake system.

The above and other important objects and advantages of this invention will become apparent as the description proceeds, reference being had to the accompanying drawings wherein:

Figure 1 is a plan view of the pedals and spacer between them of this invention;

Fig. 2 is a sectional view taken on the line 2—2 of Figure 1;

Fig. 3 is a sectional view similar to Fig. 2 showing a modified type of spacing element;

Fig. 4 is a sectional view taken on the line 4—4 of Fig. 3, somewhat enlarged;

Fig. 5 is a plan view similar to Figure 1 showing a modified construction for pedals and foot rest;

Fig. 6 is a view similar to Fig. 5 showing a modification thereof;

Fig. 7 is a plan view similar to Figs. 5 and 6 showing another modification;

Fig. 8 is a sectional view taken on the line 8—8 of Fig. 7;

Fig. 9 is a plan view similar to Figs. 5 and 6 showing another modification for a different use;

Fig. 10 is a plan view similar to Figs. 5 and 6 showing another modification for still another use;

Fig. 11 is a sectional view showing a brake control linkage and a pedal arrangement therefor according to the modification shown by Fig. 5; and Fig. 12 is a modification of a portion of Fig. 11.

Referring to Figures 1 and 2, the floor board 20 has arranged on it the steering post S, the clutch pedal C, the manual brake pedal b, the power brake pedal B and the accelerator pedal A. By floor board is meant any suitable support for the pedals and accessories. The accelerator and power brake pedals are pivotally connected to the floor board at their bottom as indicated at 21. The tops of these pedals are suitably connected, either pivotally or slidably, to the links 22 which pass through the floor board to the elements to be controlled. All of the pedals may be biased to their fully retracted position by any well known means, such as springs 23.

The pedals A and B are arranged at the same level and are separated from each other to provide a space between them. In this space is located a bracket 24 fixed to the floor board and on this bracket is rotatably mounted a roller 25. The height of the bracket and roller above the floor board is such that it is at least as high or, preferably, slightly higher than the height of the pedals A and B when in fully retracted position.

It will thus be seen from this construction that the foot of the operator may be slid back and forth to and from pedals A and B with the smallest time elapse because of the even height of the two pedals. Also, both pedals cannot be accidently operated simultaneously because of the fixed bracket and roller separating the two pedals.

Figs. 3 and 4 show a modified and simpler type of spacer bracket between the pedals A and B. It comprises a spacer bracket 26 of U-shaped cross-section, as shown. The roller is eliminated and the height of this spacer above the floor board relative to the pedals is the same as in the first modification. It will be appreciated that the cross-section of the spacer bracket may take any other suitable shape, but it must be relatively narrow so that the pedals will be as close together as possible.

The modification shown by Fig. 5 is generally similar in pedal arrangement as that shown by Figure 1 and similar parts are similarly designated. Instead of the long pedals A and B of Figure 1, they are made relatively small and are fixedly attached to links 22. A foot supporting treadle 27 is pivotally connected at 28 to the floor board and is resiliently supported in any usual manner to be maintained normally in its retracted position. The treadle is symmetrically centered relative to pedals A and B and spacer bracket 24. The foot of the operator may thus rest comfortably on treadle 27 and roller 25 when neither of the pedals is to be operated and may be slid easily to either pedal in a minimum time.

The pedal arrangement of Figs. 1 and 6 may be used for engines which operate on gasoline at one time and on oil at another. On such an engine the pedal A would be connected to one accelerator and the pedal B to the other. The pedals b and C would be for the brake and clutch, respectively.

In both Figs. 1 and 5, the pedal B is for operating a power brake. If that should fail the foot may be shifted to operate the emergency manual brake pedal b.

Fig. 6 duplicates the pedal and treadle arrangement of Fig. 5 on the left side of the steering post. The pedal designated as A' is for an additional accelerator and C is for the clutch.

Figs. 7 and 8 show a modified type of pedal construction for an arrangement like that shown by Fig. 6. The pedals are pivoted at 29 to their links 22 and are freely slidable on the floor board at their bottom. This allows free sliding motion of the pedals on the floor board as they are operated in the arcuate path of the links 22.

Fig. 9 shows a pedal and treadle arrangement generally similar to Fig. 6; that on the right side of the steering post being the same as in Fig. 6. On the left side of the steering post a series of four pedals r, I, II and III are arranged adjacent to each other and are each separated from the other by a spacer bracket and roller. These pedals are for operating a gear shift of a transmission for driving in reverse, first, second and high gear, respectively. Such an arrangement is to be used with an automatic or a fluid drive clutch.

The arrangement of Fig. 10 is for use in operating tractors, tanks or aircraft when maneuvering on the ground. The three pedals L, B and R are arranged in adjacent relationship separated by spacer brackets and rollers. Arms 30 integral with pedals L and R extend beneath the pedal B providing for simultaneous operation of L and R when B is depressed.

In operation on a tractor, tank or aircraft, when a right turn is desired the pedal R is depressed. This applies a brake on the right side of the machine. The left side being free, a right turn is accomplished. For a left turn, the pedal L is depressed thus braking the left side. For stopping the machine, the pedal B is depressed and both brakes are applied.

Fig. 11 shows the pedal and treadle arrangement of Fig. 5 when applied to a brake operating linkage of a novel construction.

The manual brake pedal b is connected to a lever 31 fulcrumed at 32 to which is connected the brake rod 33 for operating the brake either directly or through the brake power piston (not shown). The power brake pedal B is connected to a lever 34 fulcrumed at 35 on a bracket 36 which is fixed to lever 31. The other end of lever 34 is bent upwards and connected at 37 to wire 38 which is slidably encased in sheath 39 held in bracket 40 on lever 31 and bracket 41 connected to any fixed part of the chassis. Wire 38 leads to a valve that controls the pressure to the power brake cylinder. The end of lever 34 to which the wire 38 is connected contacts the bracket 36 after a short clockwise motion, that is, a short lost motion.

The operation of this mechanism is as follows: When pedal B is depressed the other end of lever 34 pulls the wire 38 to operate the valve that controls the pressure to the power cylinder that operates the brake. The power piston will move to apply the brake and since it is connected to lever 31 by way of rod 33 it will cause depression of manual brake pedal b. As long as pedal B is moved downward by the operator, pedal b will follow in the same direction. If the power source for the power brake cylinder should fail the pedal B will be depressed until the other end of lever 34 contacts bracket 36. Further motion of pedal B downward will operate lever 31 by direct contact to apply the brake manually by way of rod 33. Manual operation of the brake with a greater leverage can be attained by direct action of the foot on the pedal b.

Fig. 12 shows a modification of the lower portion of Fig. 11 adapted to be used with a hydraulic brake system. The lever 31 has connected to it above point 32 a piston rod 42 which operates the piston (not shown) in the master cylinder 43. The pipe 44 directs the fluid from the master cylinder to the brake cylinders (not shown). A link 45 is pivoted on shaft 32 and is integral with or rigidly connected to lever 31. Link 45 is connected to the power piston (not shown) of the brake booster cylinder 46 by way of link 47. The linkage and pedal structure above this point is the same as in Fig. 11.

In operation of this modification, when pedal B is depressed, the valve (not shown) operated through wire 38 will supply differential pressure fluid to the booster cylinder to operate the booster piston which pulls link 47 to operate link 45 and lever 31 clockwise about pivot 32 to supply hydraulic fluid through pipe 44 to apply the brakes. If the power supply to the booster cylinder fails, the lever 34 will be operated through the lost motion between its end connection 37 and bracket 36 until the bracket is contacted and the hydraulic brake will then be manually applied by the direct actuation of lever 31 as previously explained.

I do not wish to be limited by the exact structures and arrangements as are herein disclosed, but all equivalents as may fall within the scope of the appended claims are meant to be included.

I claim:

1. In a control system of the character described, a floor board, a plurality of pedals arranged in adjacent relationship on the floor board, a spacer member fixed to the floor board arranged between each two adjacent pedals, said spacer members being entirely separate and disconnected from the pedals and comprising a roller arranged to roll crosswise of the pedals.

2. In a control system of the character described, a floor board, a plurality of pedals arranged in adjacent relationship on the floor board, a spacer member fixed to the floor board arranged between each two adjacent pedals, said spacer members extending upwards at least as high as the top position of the pedals and being entirely separate and disconnected from the pedals and comprising a roller arranged to roll crosswise of the pedals.

3. In a control system of the character described a floor board, a plurality of pedals arranged in adjacent relationship on the floor board, said pedals being pivotally connected at the bottom to the floor board, a spacer member fixed to the floor board arranged between each two adjacent pedals, said spacer members being entirely separate and disconnected from the pedals and comprising a roller arranged to roll crosswise of the pedals.

4. In a control system of the character described, a floor board, a plurality of pedals arranged in adjacent relationship on the floor board, said pedals being pivotally connected at the bottom to the floor board, a spacer member fixed to the floor board arranged between each two adjacent pedals, said spacer members extending upwards at least as high as the top position of the pedals and being entirely separate and disconnected from the pedals and comprising a roller arranged to roll crosswise of the pedals.

5. In a control system of the character described, a floor board, a plurality of pedals arranged in adjacent relationship on the floor board, a spacer member fixed to the floor board arranged between each two adjacent pedals, said spacer members being entirely separate and disconnected from the pedals, and a resiliently mounted floor supporting treadle separate from the pedals pivotally connected at its bottom to the floor board and arranged in symmetrical relation with respect to the plurality of pedals.

6. In a control system of the character described, a floor board, a plurality of pedals arranged in adjacent relationship on the floor board, a spacer member fixed to the floor board arranged between each two adjacent pedals, said spacer members extending upwards at least as high as the top position of the pedals and being entirely separate and disconnected from the pedals, and a resiliently mounted foot supporting treadle separate from the pedals pivotally connected at its bottom to the floor board and arranged in symmetrical relation with respect to the plurality of pedals.

7. In a control system of the character described, a floor board, a steering post, sets of pedals arranged on the floor board at either side of the steering post, each set of pedals arranged in adjacent relationship, spacer members fixed to the floor board arranged between each two adjacent pedals, and a resiliently mounted foot supporting treadle for each set of pedals separate therefrom pivotally connected at its bottom to the floor board and arranged in symmetrical relation with respect to each set of pedals.

8. In a control system of the character described, a floor board, a steering post, sets of pedals arranged on the floor board at either side of the steering post, each set of pedals arranged in adjacent relationship, spacer members fixed to the floor board arranged between each two adjacent pedals, said spacer members extending upwards at least as high as the top position of the pedals and being entirely separate and disconnected from the pedals, and a resiliently mounted foot supporting treadle for each set of pedals separate therefrom pivotally connected at its bottom to the floor board and arranged in symmetrical relation with respect to each set of pedals.

9. In a control system of the character described, a pedal support, three pedals arranged in adjacent relationship on the support, spacer members fixed to the support, arranged between adjacent pedals, said spacer members being entirely separate and disconnected from the pedals, projections extending inwardly from the end pedals fitting beneath the center pedal whereby the end pedals may be individually operated or all pedals may be operated by the operation of the center pedal.

10. In a control system of the character described, a pedal support, three pedals arranged in adjacent relationship on the support, spacer members fixed to the support arranged between adjacent pedals, said spacer members being entirely separate and disconnected from the pedals, projections extending inwardly from the end pedals fitting beneath the center pedal whereby the end pedals may be individually operated or all pedals may be operated by the operation of the center pedal, and a resiliently mounted foot supporting treadle separate from the pedals pivotally connected at its bottom to the support and arranged in symmetrical relation with respect to the three pedals.

MATHIAS LEUPOLD.